(12) United States Patent
Karlinski, III et al.

(10) Patent No.: US 8,463,699 B2
(45) Date of Patent: Jun. 11, 2013

(54) METHOD AND SYSTEM OF DETERMINING AND APPLYING INSURANCE PROFIT SCORES

(75) Inventors: Frank J. Karlinski, III, Red Bank, NJ (US); Vincent L. Napoli, Flemington, NJ (US)

(73) Assignee: American International Group, New York, NY (US)

( * ) Notice: Subject to any disclaimer, the term of this patent is extended or adjusted under 35 U.S.C. 154(b) by 935 days.

(21) Appl. No.: 12/251,188

(22) Filed: Oct. 14, 2008

(65) Prior Publication Data

US 2010/0094661 A1    Apr. 15, 2010

(51) Int. Cl.
*G06Q 40/00*    (2012.01)
(52) U.S. Cl.
USPC ............................... 705/38; 705/35; 705/36 R
(58) Field of Classification Search
USPC .......................................................... 705/38
See application file for complete search history.

(56) References Cited

U.S. PATENT DOCUMENTS

| | | | |
|---|---|---|---|
| 7,277,861 B1 * | 10/2007 | Benson et al. | ..................... 705/4 |
| 2002/0161609 A1 * | 10/2002 | Zizzamia et al. | ................. 705/4 |
| 2003/0097292 A1 * | 5/2003 | Chen et al. | ..................... 705/10 |
| 2007/0043662 A1 | 2/2007 | Lancaster | |
| 2007/0226014 A1 | 9/2007 | Alemayehu | |

OTHER PUBLICATIONS

International Searching Authority, International Search Report and Written Opinion relative to related International Application No. PCT/US09/60483 mailed Nov. 25, 2009.

* cited by examiner

*Primary Examiner* — Kirsten Apple
(74) *Attorney, Agent, or Firm* — Leydig, Voit & Mayer, Ltd.

(57) ABSTRACT

Preferred embodiments of the invention include a new and innovative method and system of determining a profit score for an individual policy, which score may be used to evaluate the desirability of offering or renewing individual insurance policies. The present invention also may be applied to determine the profitability of aggregate books of business, which may be offered by individual insurance agents or agencies, whether captive or independent.

9 Claims, 5 Drawing Sheets

FIG. 5

PROFIT SCORE 501 | 527

Language/言語 506 | English — 500

CONTRACT INFORMATION — 502

| PAY TYPE | Association |
|---|---|
| NEW RENEWAL TYPE | Renew |
| OKINAWA RATE | Other than Okinawa |

INSURED INFORMATION — 503

| ADDRESS | Capital |
|---|---|
| AREA | Tohoku |
| INSURED AGE | 35-36 |
| LICENSE COLOR TYPE | Blue |
| MARRIAGE TYPE | Married |
| GENDER TYPE | Female |
| ACCIDENT EXPERIENCE | W/1time |

CAR INFORMATION — 504

| CARCLASS | 11:Sedan |
|---|---|
| ABS | W/ |
| AIRBAG | W/O |
| SAFETY BODY | W/ |
| BI RATE CLASS | 1 |
| OD RATE CLASS | 1 |
| PD RATE CLASS | 1 |
| NEWCAR | New Car |

USE INFORMATION — 505

| AGE CONDITION | Age 26+ |
|---|---|
| CHILD RIDER | W/ All Age |
| TEM DRIVER RIDER | W/ |
| ANNUAL DRIVE MILEAGE | 5,000Km-9,999Km |
| BUSINESS USE | Business Use |
| COMMUTE USE | Commute use |
| KEISHIN SCORE | 901-1000 |

DISCOUNT — 507

| NONFLEET GRADE | 20 |
|---|---|
| LONG TERM LOYAL DISCNT | W/ |
| HANDICAP DISCNT | W/O |
| MULTI CAR DISCOUNT | W/ |
| NEW BUSINESS DISCOUNT | W/ |
| NF LARGE NO DISCNT | W/3-5 |
| PIC DISCOUNT | W/ |

COVERAGE INFORMATION — 508

| PD INSURED AMT | -1000K |
|---|---|
| PD DEDUCTIBLE AMOUNT | 10K |
| PA 1 PERSON INS. AMT | 7001K-8000K |
| PA HOSPITAL INS. AM | 1000Yen |
| PIC COVER | W/ |
| PIC INSURED AMOUNT | 30000K |
| PIC INSURED CAR ONLY RIDER | W/ |
| OD RIDER | W/O OD |
| OD INSURED AMOUNT | -100K |
| OD DEDUCTIBLE AMOUNT | 0-100K |

RIDER — 509

| HOMEGARAGE EXC. RIDER | W/O |
|---|---|
| EITL RIDER | W/O |
| OD THEFT EXC. RIDER | W/O |
| PD REPAIR EXCESS COST RIDER | W/ |
| TRAFFIC ACCIDENT RIDER | Whole Family w/o Medical |
| FAMILY LIMIT | H&W |

METHOD AND SYSTEM OF DETERMINING AND APPLYING INSURANCE PROFIT SCORES

FIELD OF THE INVENTION

The invention is generally related to a method and system of determining and applying profit scores calculated from insurance data, such as automobile insurance data.

BACKGROUND OF THE INVENTION

Insurance companies transfer a risk of loss in exchange for payment of a premium by the insured. In order to determine the amount of the premium, insurance companies attempt to determine the likelihood that a loss will occur. Ideally, insurance premiums should correlate with the frequency and severity of the potential exposure to risk. In the case of automobile insurance, for example, an insured's driving experience and actual driving record are factors that correlate with likelihood of loss.

In furtherance of anti-discrimination policies, many governments throughout the world impose restrictions on the types of factors that insurance companies may use to rate insurance. As one example, the State of California defines three mandatory ratings factors and several optional ratings factors to be used in establishing automobile insurance premiums. Only the approved list of factors may be used in determining premiums. These restrictions can result in insurance companies charging premiums that do not correlate as accurately as possible with potential risk of loss. In specific situations, insurance companies may undercharge certain potential insureds in view of the risk of loss.

Insurance companies define their profits as earned premiums plus investment income less incurred loss and underwriting expenses. An insurance company that charges less of a premium than is warranted will recognize less profit. Conversely, an insurance company that charges a higher premium will recognize more profit. In a competitive market, price competition among insurers establishes an upper limit on the amount of premiums. An insurer can charge only the amount that an insured is willing to pay. Downward price pressure due to competition, particularly when coupled with restrictions on the ability to more accurately rate insurance risks, results in insurance companies charging suboptimal premiums and, therefore, obtaining suboptimal profits.

The prior art includes a description of determining types of profitability information for certain types of new or existing insurance policies. For example, U.S. Patent Application No. 2002/0161609 A1, filed by Zizzamia et al. and published on Oct. 31, 2002, describes a process of creating a predictive model to calculate a quantitative score for commercial insurance policies. The predictive model, in turn, requires "external data sources," such as zip code level census data, county level data such as weather, and business owner household level demographics to compute profitability information (see paragraphs 13, 35-41). In the absence of such external data, the methods of Zizzamia could not determine expected profitability. In addition, the Zizzamia application refers to a "score," calculated from external data sources, but it does not describe the score as being normalized across different discrete books of business. Rather, the Zizzamia application uses the calculated score to sort a particular policy into one of ten deciles, for which a particular loss ratio has been determined (see paragraphs 93-94). Zizzamia does not provide any description as to how profitability information may be calculated or used outside of the commercial insurance market.

BRIEF SUMMARY OF THE INVENTION

The invention comprises, among other things, a new and innovative method and system of determining a profit score for an individual policy, which score may be used to evaluate the desirability of offering or renewing individual insurance policies. The present invention also may be applied to determine the profitability of aggregate books of business, which may be offered by individual insurance agents or agencies, whether captive or independent.

BRIEF DESCRIPTION OF THE SEVERAL VIEWS OF THE DRAWING(S)

FIG. 1 schematically illustrates an exemplary environment in which the invention may be used;

FIG. 5 is a sample screen shot of a graphical user interface used for determining a profit score for particular risk.

DETAILED DESCRIPTION OF THE INVENTION

Figure 1:
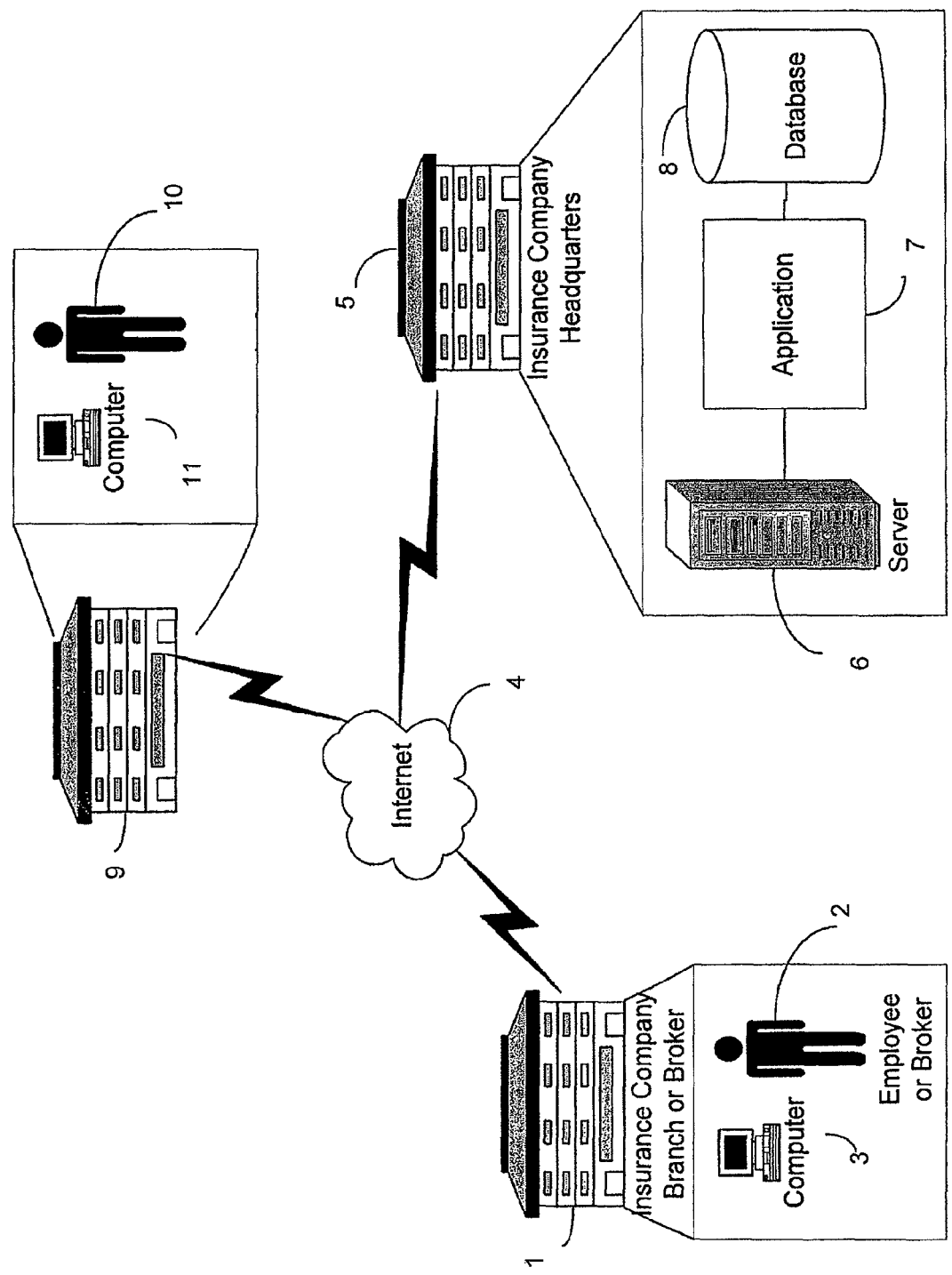

As illustrated in FIG. 1, an insurance company branch 1 has employees or brokers, indicated generally by reference numeral 2, that respond to requests for insurance and further process insurance related data, such as data related to a claim. Employees of insurance company branch 1 process insurance claims and further make decisions as to whether to offer or renew insurance policies. In addition, an insurance company may use a direct acquisition process that does not utilize employees, agents or brokers. The systems and processes described in this specification apply without limitation to all avenues of insurance sales and marketing.

The electronic data systems of branch office 1 typically connect with the insurance company headquarters 5 via a computer network, such as the Internet 4. An insurance company headquarters, such as headquarters 5, typically maintains its own separate electronic data processing equipment and software, such as server 6, application 7 and database 8. The branch office transmits insurance information through email, file transfer or otherwise, as requested by the headquarters 5 of the insurance company.

The insurance company 5 may further delegate some or all of its insurance business to an independent agency, such as agency 9. As with branch office 1, an independent agency 9, will typically have employees, indicated by reference numeral 10, that use electronic systems, such as computer 11. In this arrangement, the independent agency, like the branch office, will interact with electronic systems of the insurance company headquarters 5.

A request for insurance from the insurance company 5 will be processed by a branch office 1, an independent agency 9, or by the insurance company 5 itself. In order to provide a quotation for an insurance premium, the insurance company (either directly or indirectly) will inquire as to risk factors and the nature of insurance sought in order to underwrite the risk as accurately as possible. For automobile insurance, a potential insured may be required to provide to the insurance company information regarding the vehicle to be insured, such as make, model and year. The insurance company also typically will require a potential insured to provide personal information, such as gender, age, location of garaging of the vehicle, other drivers on the policy, marital status, driving experience, driving record, and anticipated mileage during the insurance period.

In accordance with any applicable ratings regulations, the insurance company or its brokers or agents will use the information supplied by the insured or potential insured to determine an applicable premium. In those jurisdictions that restrict or prohibit use of certain information during the ratings process, the insurance premium may not accurately reflect the likelihood of loss for a particular policy. In a typical prior art insurance process, the profitability of a particular insurance policy is not a factor that an insurance company will use to determine whether to offer or renew a specific insurance policy at a specific rate.

Figure 2:
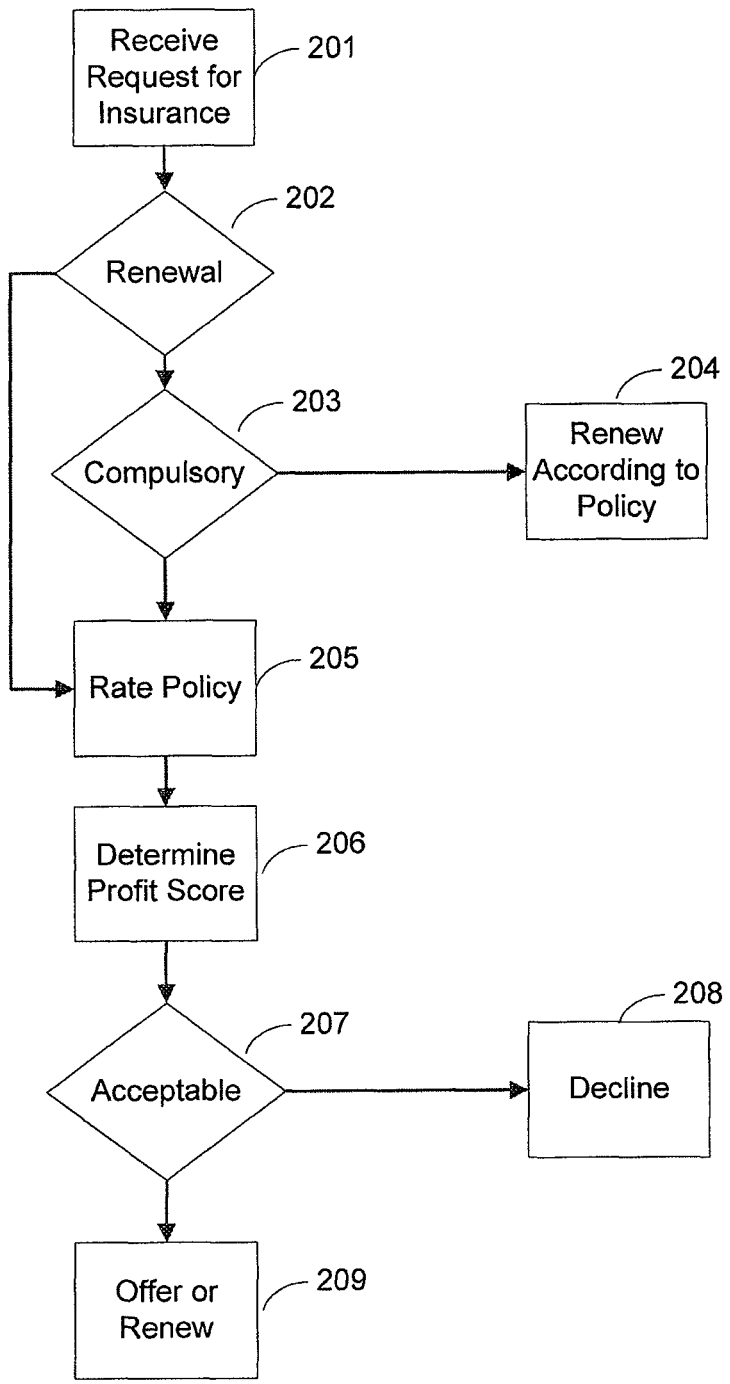
FIG. 2 is a flow diagram illustrating an aspect of the invention directed to a determination of a profit score and use of the profit score in connection with a single insurance request.

FIG. 2 illustrates an aspect of the invention in which a profitability score is used to determine whether to issue or renew a specific insurance policy. At step 201, the insurance company or its broker or agent (hereinafter generically referenced as "the insurance company") receives a request for insurance. The insurance request may be categorized as a new request or a renewal of an existing insurance policy. If a request for insurance is a renewal, the insurance company may be obligated to renew the insurance as a condition of contract or by action of law. If a renewal policy is not issued as a compulsory matter, an insurance company may consider the renewal policy in a manner similar to a new request, at least for purposes of rating the risk. These considerations are illustrated in decision blocks 202 and 203 of FIG. 2. As indicated by step 204, if a policy must be renewed according to a compulsory process, whether by contract or law, the insurance company will do so in accordance with the existing policy. Alternatively, the renewal or new insurance request will be rated.

The underwriting steps associated with generating a premium for a given risk are well understood to persons of skill in the art. At step 205, the policy is rated in a customary manner, which, in the case of automobile insurance, may involve factors such as the vehicle and driving history of the potential insured. At step 206, however, the process diverges from the prior art. FIG. 2 includes step 206 of determining a profit score.

A profit score is a scaled and unitless value. In a preferred embodiment, it may be calculated according to the process of FIG. 4 and as described below. A profit score relates an expected profit margin (or an expected range of profit margins) to a given risk. The expected profit margin, in turn, is calculated from historical data. In a preferred embodiment of the invention, a profit score ranges from below 0 to above 1000 with the majority of profit scores for a given risk expected to fall within the range of 0 to 1000.

TABLE 1

| Profit Score | Profit Margin |
| --- | --- |
| Above 1000 | >=37% |
| 900-1000 | 28%~37% |
| 800-900 | 19%~28% |
| 700-800 | 10%~19% |
| 600-700 | 1%~10% |

TABLE 1-continued

| Profit Score | Profit Margin |
| --- | --- |
| 500-600 | −8%~1% |
| 400-500 | −17%~−8% |
| 300-400 | −26%~−17% |
| 200-300 | −35%~−26% |
| 100-200 | −45%~−35% |
| 0-100 | −54%~−45% |
| Below 0 | <=−54% |

Table 1 illustrates an exemplary relationship between profit scores and profit margins for a given risk. A profit score that is above the line in Table 1 indicates positive profitability. For example, a profit score in the range of 600 to 700 indicates an expected positive profit margin in the range of 1% to 10%. Conversely, a profit score that falls below the line in Table 1 indicates negative profitability. A profit score within the range of 500 to 600 would indicate an expected loss ranging from negative 1% to negative 8%. Profit scores according to the invention efficiently allow an insurance company to determine the expected profitability of insuring a particular risk.

As illustrated in the flow diagram of FIG. 2, the profit score is determined at step 206 after the policy has been rated, at step 205. The sequence of determining the profit score, however, is not consequential. The rating process, which should be performed according to sound actuarial and underwriting methodologies that comply with applicable rules and regulations, is necessary before a premium may be determined. However, it is not necessary to rate a particular risk prior to determining a profit score. Determination of a profit score likewise is not required for calculation of an insurance premium. At decision block 207, the profit score is compared against a threshold to determine whether the expected profit is acceptable for an individual risk. If not, the insurance application may be denied and referred to an underwriter for review, as indicated at step 208. Conversely, if the risk can be rated, and if the profit score is acceptable, an offer of insurance will be extended, as indicated at step 209.

The decision as to whether a profit score will be deemed acceptable, as at decision block 207, includes variables such as the jurisdiction and particular insurance company's appetite for profit. In certain markets, an insurance company may decide that a 10% profit margin is inadequate. In other markets, this may be a highly desirable profit margin. Therefore, the step of determining whether a given profit score is acceptable depends on appropriately setting the threshold value against which the profit score is evaluated.

Figure 3:
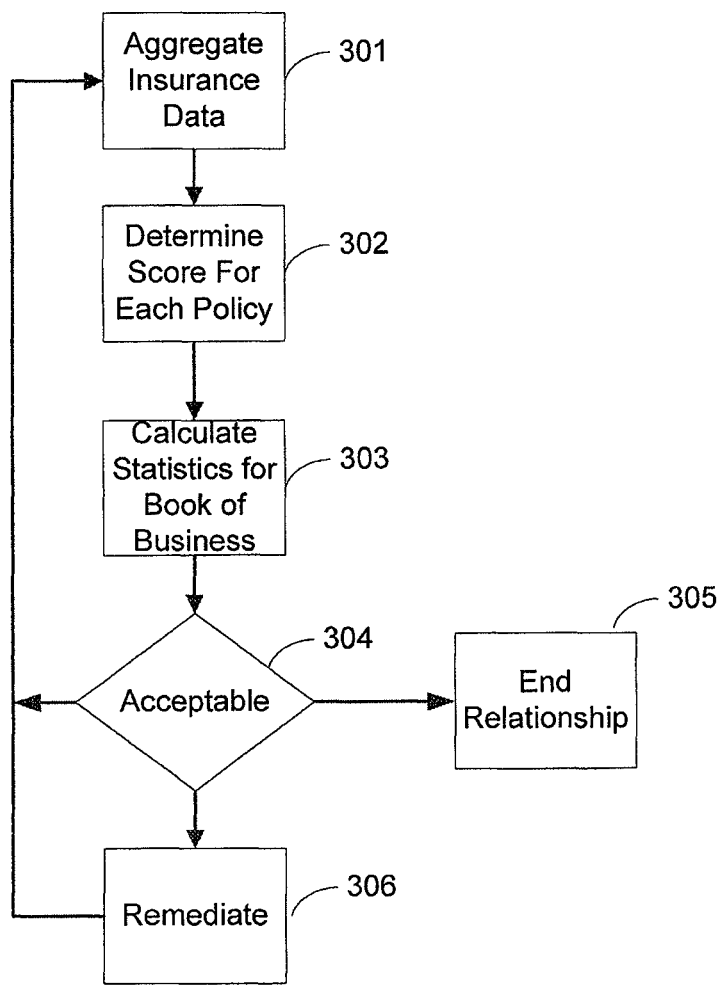
FIG. 3 is a flow diagram illustrating an aspect of the invention directed to a determination of profit scores and use of aggregated profit score statistics for a book of business.

FIG. 3 illustrates a further aspect of the invention. An insurance company may seek to evaluate the profitability of a branch office, such as office 1 (FIG. 1), or an independent agency, such as agency 9 (FIG. 1), in connection with a specific book of business. To accomplish this result, in accordance with the invention, the insurance company 5 may aggregate insurance data, step 301, which data may be contained on the company's electronic systems 6-8 (FIG. 1) or acquired on an as-needed basis from the branch offices and agencies. After the relevant data has been collected, the insurance company's electronic systems calculate a profit score for each policy within the relevant book of business, step 302.

The insurance company's electronic systems further calculate descriptive statistics for the relevant book of business, step 303. Such statistics may include, for example, the median, mean, mode, standard deviation, and/or range and distribution of profit scores for a particular book of business. The insurance company thereafter compares the calculated statistics with one or more thresholds to determine whether a book of business has met expectations, decision block 304. Depending on the outcome of this comparison, an insurance company may decide that a particular book of business should be terminated, step 305, or that specific remediation steps are necessary, step 306. An example of suitable remediation may include an instruction from the insurance company to the branch office or agency not to issue or renew certain policies without the approval of the insurance company. To the extent that an insurance company determines that descriptive statistics pertaining to aggregated profit scores are acceptable, the company may choose to take no further action. This step is indicated in FIG. 3 by a return from decision block 304 to the step of aggregating insurance data, step 301, at an appropriate time.

Figure 4:
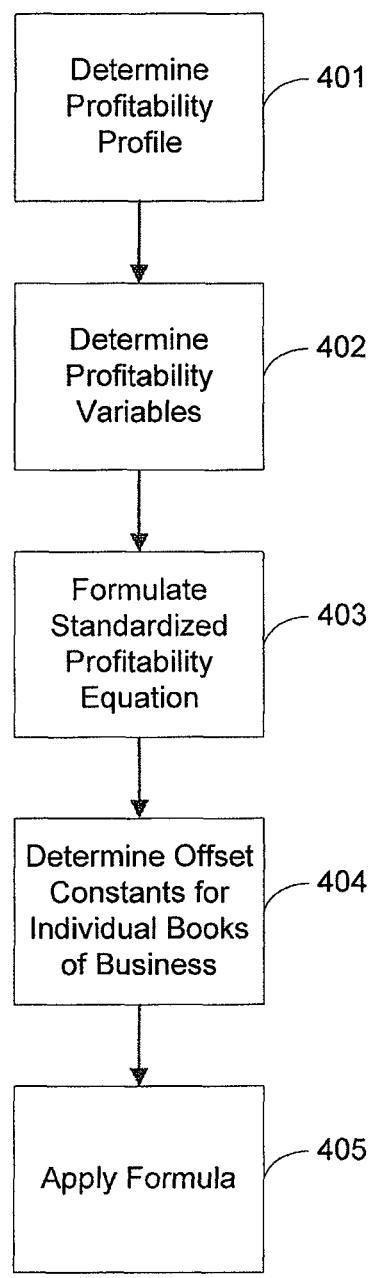
FIG. 4 is a flow diagram generally indicating the steps associated with creation of a profit score formula and use of that formula to determine a profit score for an individual risk.

FIG. 4 illustrates the specific steps by which a profit score may be determined. At steps 401 and 402, the insurance company determines a profitability profile and the variables used in determining profitability. This step is preferably conducted by regression analysis or other statistical processing technique as applied to historical data associated with past premiums and loss experience. Based on these techniques, it is possible to derive a standardized profitability equation. In a preferred embodiment of the invention, the equation may assume the following general form:

$$\text{profit score} = K_1 - K_2 \left( K_3 \prod_{i=m}^{n} x_i + K_4 \right)$$

In this equation, the profit score includes several offset constants, indicated by $K_1$ through $K_4$, which standardize the profitability score across different countries and different books of business. The mathematical products of individual variables, indicated by $x_i$, are scaled by a constant, $K_3$, added to another constant, $K_4$, and the sum of these is scaled by constant $K_2$, which product is then subtracted from a first constant, $K_1$.

The step of determining the offset constants, step 404, involves normalizing historical data across all books of business to find suitable constants. Through the use of appropriate constants, the equation, as applied to individual books of business in various jurisdictions, results in a single profit score scale that may be used to compare the profitability of any individual risk. After the formula is derived, it is possible to apply the formula to a particular risk, step 405. The factors and constants may change based on different variable combinations to identify the profitable risks and unprofitable risks. Each country or jurisdiction may have a different set of variables and factors.

A specific example of calculating a profit score according to the present invention follows. In the hypothetical example of Table 2, a male seeks to renew an existing policy with a 6% deductible. The values in the table corresponding to the "Factor" column correspond to the variables, $x_i$, in the equation identified above.

TABLE 2

| Variable | Profile | Factor |
| --- | --- | --- |
| Gender | Male | 1.000 |
| New/Renewal | Renewal | 0.915 |
| Deductible | 6% | 0.952 |
| Vehicle Type | Auto | 1.000 |
| Vehicle OD Group | B | 1.112 |
| Vehicle Model Year | 1996 | 1.605 |
| Engine Size | <=3,000 CC | 0.875 |

TABLE 2-continued

| Variable | Profile | Factor |
| --- | --- | --- |
| Origin of Vehicle | Imported | 1.024 |
| Transmission | Automatic | 1.000 |
| Number of Doors | 4 | 1.000 |
| Territory | 3 | 1.000 |

In this example, and based on an appropriate statistical analysis, $K_1=1690$, $K_2=1100$, $K_3=0.52$, and $K_4=0.183$. A profit score computed for this policy would thus be equal to 1690−1100×(0.52×1.000×0.915×0.952×1.000×1.112× 1.605×0.875×1.024×1.000×1.000×1.000+0.183), which is 692. According to Table 1, therefore, this risk would fall in the 1 to 10% profit margin.

FIG. 5 illustrates a graphic user interface 500 in which appropriate variables may be selected for determining a profit score in a particular jurisdiction. The language of the interface may be suitably modified, as indicated by drop down box 506. In interface 500, the profit score equation has been determined and is implemented according to the variables selected or otherwise input through the interface. Example variables used in the profitability equation may include contract information 502, insured information 503, vehicle information 504, use information 505, discount information 507, coverage information 508, and rider or endorsement information 509. Based on the information included in the insurance companies database, and the profitability formula as described above, the interface is able to return a specific profit score 501 for a specific risk.

A novel and innovative underwriting methodology and insurance product has been described. The methods and systems of the present invention provide approaches to determining a profit score for a given risk. Although the foregoing embodiments of the invention have been described to assist a person of skill in the art, the invention is not limited to the provided details.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of evaluating a book of automobile insurance business comprising:

electronically obtaining information associated with a risk of loss for each automobile insurance policy in the book of business;

deriving a standardized profitability equation, wherein the standardized profitability equation is:

$$\text{profit score} = K_1 - K_2 \left( K_3 \prod_{i=m}^{n} x_i + K_4 \right),$$

where $K_1$ through $K_4$ are offset constants and $x_i$ are profitability variables;

calculating with a computer an expected profitability score representative of an expected profit margin associated with a premium for each automobile insurance policy in the book of business wherein each expected profitability score is calculated using the standardized profitability equation and has a normalized value;

calculating with a computer at least one descriptive statistic for the expected profitability scores; and comparing the at least one descriptive statistic with a predetermined threshold.

2. The method of claim 1 further comprising removing authority to issue renewal policies associated with the book of business if the at least one descriptive statistic exceeds the determined threshold.

3. The method of claim 1 further comprising removing authority to issue renewal policies associated with the book of business if the at least one descriptive statistic falls below the predetermined threshold.

4. The method of claim 1 wherein the expected profitability scores are calculated exclusively from variable information provided by the insured.

5. The method of claim 1 wherein the expected profitability score is calculated in part based on information other than the information used to determine the premium.

6. The method of claim 1 wherein calculating at least one descriptive statistic for the expected profitability scores includes calculating at least one of the median, the mean, the mode, the standard deviation, the range, and the distribution of the expected profitability scores.

7. The method of claim 1 further comprising determining the offset constants by normalizing historical data.

8. The method of claim 1 further comprising determining a profitability profile and using a computer to perform a regression analysis to historical data associated with past premiums and loss experience to determine the profitability variables.

9. The method of claim 8 further comprising determining the offset constants by normalizing historical data.

* * * * *